United States Patent
Urmaza et al.

[11] Patent Number: 6,135,910
[45] Date of Patent: Oct. 24, 2000

[54] PLANET WASHER

[75] Inventors: Matthew Urmaza; Douglas Wennberg, both of New Hartford, Conn.

[73] Assignee: The Torrington Company, Torrington, Conn.

[21] Appl. No.: 09/376,798

[22] Filed: Aug. 18, 1999

[51] Int. Cl.[7] .................................................. F16H 57/04
[52] U.S. Cl. ........................................... 475/159; 475/348
[58] Field of Search ................................... 475/159, 331, 475/348

[56] References Cited

U.S. PATENT DOCUMENTS

| | | |
|---|---|---|
| 2,249,501 | 7/1941 | Teker . |
| 3,199,375 | 8/1965 | Rosen et al. . |
| 4,480,492 | 11/1984 | Fujioka et al. ............................ 475/348 |
| 4,776,237 | 10/1988 | Premiski et al. ......................... 475/348 |
| 4,983,152 | 1/1991 | Kimberlin et al. ....................... 475/331 |
| 5,188,576 | 2/1993 | Maguire et al. .......................... 475/159 |
| 5,795,258 | 8/1998 | Faass et al. .............................. 475/348 |

Primary Examiner—Sherry Estremsky
Attorney, Agent, or Firm—John C. Bigler

[57] ABSTRACT

A substantially flat steel ring with a round perimeter and a central aperture has at least two arcuate slots concentric with the round perimeter. The arcuate slots are defined by arcs about the axis of the flat steel ring such that at least a portion of the arcuate slots is in axial alignment with planetary rollers when the planet washer is positioned in a planetary gear set.

8 Claims, 2 Drawing Sheets

PLANET WASHER

BACKGROUND OF THE INVENTION

This invention relates generally to planetary gear sets and, more particularly, to a planet washer to be used on a planet shaft adjacent to a planet gear to provide improved lubricant flow.

Typically, a planetary gear set uses plain, flat planet washers on planet shafts between frame members and planet gears. The planet washers receive thrust from the planet gears and retain bearings supporting the planet gears on the planet shafts. Commonly, each location uses a flat steel washer mated to a flat, sacrificial bronze washer to provide the necessary strength and friction/wear requirements.

Such conventional planet washers do not allow sufficient lubricant flow through needle bearings used to support the planet gears, even when clearances are provide along the perimeter of the apertures of the planet washers. As a result of heat buildup within the needle bearings, rollers may become blackened and damaged, leading to bearing failure. In addition, failure may result from wear on the planet washers themselves.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a planet washer for use adjacent planetary rollers in a planetary gear set. The planet washer comprises a substantially flat steel ring having an axis, a round perimeter, a central aperture and two parallel end faces. The flat steel ring provides at least two arcuate slots concentric with the round perimeter, the arcuate slots being defined by arcs about the axis of the flat steel ring such that at least a portion of the arcuate slots is in axial alignment with planetary rollers when the planet washer is positioned in a planetary gear set.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
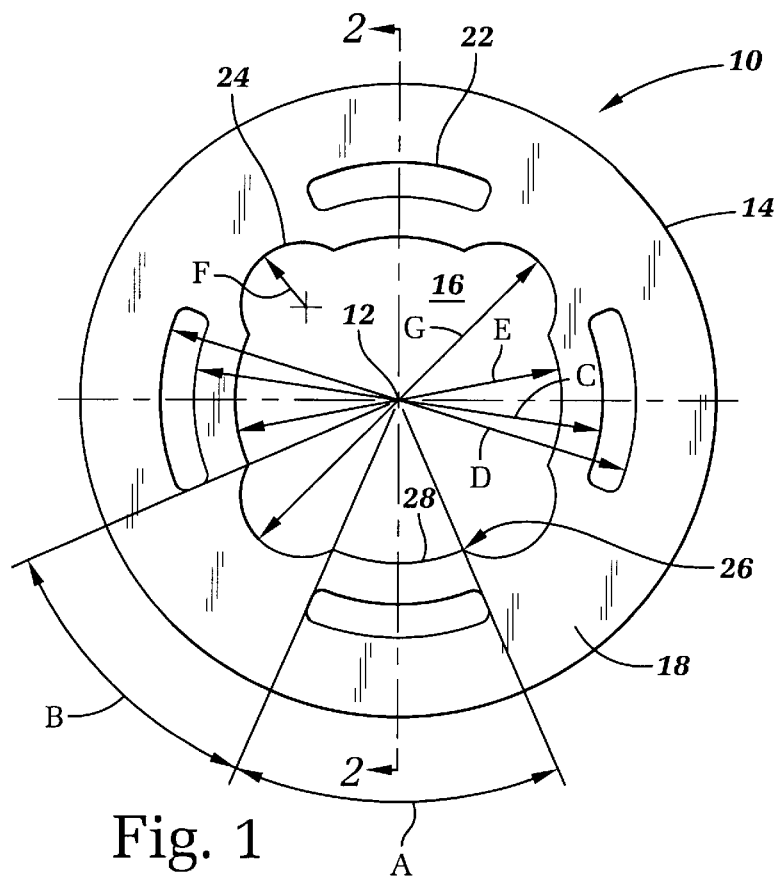
FIG. 1 is an end view of a planet washer illustrating the present invention.
Figure 2:
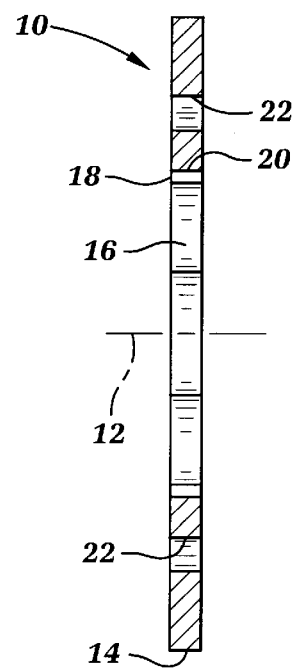
FIG. 2 is a cross sectional view of the planet washer of FIG. 1.
Figure 3:
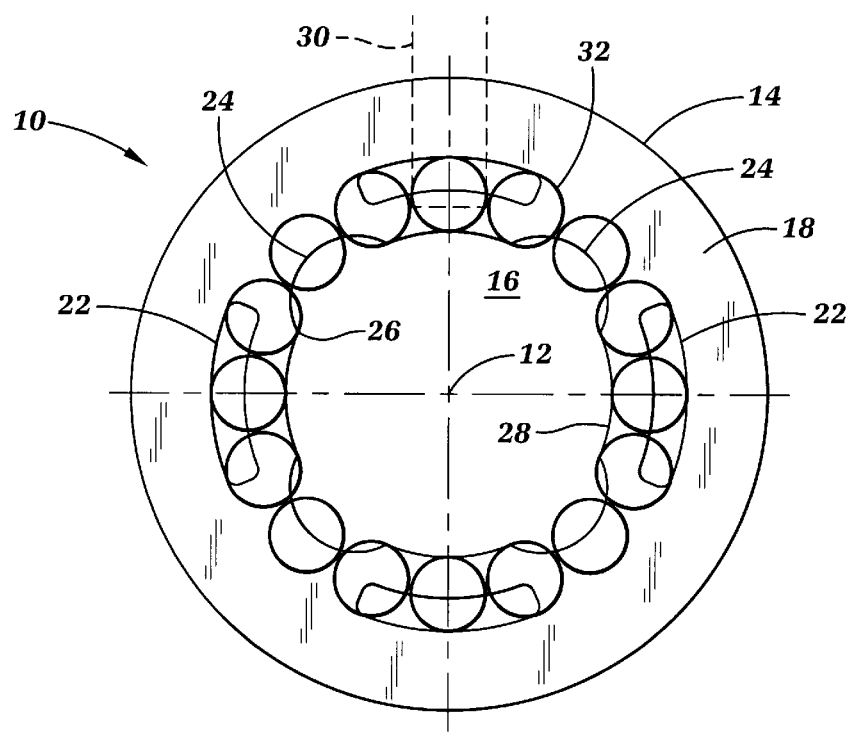
FIG. 3 is an end of the planet washer of FIG. 1, with a complement of rollers and a carrier lube groove superimposed thereon, as mounted in a planetary gear set.

Referring now to the drawings, FIGS. 1 through 3 illustrate planet washer 10, an embodiment of the present invention, comprising a substantially flat, steel ring with axis 12, round perimeter 14, central aperture 16, and two parallel end faces 18 and 20.

Between the round perimeter 14 and the central aperture 16 are a plurality of circumferentially spaced arcuate slots 22. In the embodiment shown, the arcuate slots are four in number and extend through an angle A, with respect to axis 12, forming an angle B, between the arcuate slots 22. Angles A and B may vary and need not be 45 degrees, as illustrated. For convenience of manufacturing, the arcuate slots 22 may have rounded ends, as shown. As defined by arcs about the axis 12 of the flat steel ring, the arcuate slots 22 are concentric with the round perimeter 14 and have inner and outer diameters C and D, respectively.

The central aperture 16 may be defined by a simple round opening having diameter E. Alternatively, the central aperture 16 may have scalloped portions 24 defined by radius F, between the arcuate slots 22 and extending radially outwardly to diameter G. In this illustrated embodiment, the scalloped portions 24 terminate at corners 26, adjacent a round piloting surface 28 of the central aperture 16, that may form the same angle B defined by the arcuate slots 22. The scalloped portions 24 are considered optional and may be of various sizes and circumferential lengths.

FIG. 3 illustrates the same planet washer 10, as mounted in a planetary gear set, with a complement of planetary rollers superimposed on the end view of the planet washer. A carrier lubricant groove 30, illustrated in dotted lines, extends radially inwardly at least as far as ends of the planetary rollers 32. The width of the lubricant groove 30 may correspond to the overall diameter of the planetary rollers 32, as illustrated, or may have other configurations.

As a result of this configuration of the planet washer 10 and the lubricant groove 30, the carrier lubricant groove 30 will always communicate with either the arcuate slots 22 or the scalloped portions 24, regardless of the position of the planet washer 10, as it rotates about the axis 12. Similar results could be obtained if the number of arcuate slots 22 (and the scalloped portions 24) were two, three, five or some other number. And, depending on the surface required for piloting the planet washer, the scalloped portions 24 may extend circumferentially more or less with respect to the angle B defining the space between the arcuate slots 22.

The diameter C defining the radially inward extent of the arcuate slots 22 corresponds, approximately, to a pitch diameter of the planetary rollers 32, and the diameter D defining the radially outward extent of the arcuate slots 22 corresponds, approximately, to the radially outward extent of the planetary rollers 32. Similarly, the diameter G defining the radially outward extent of the scalloped portions 24 corresponds, approximately, to the pitch diameter of the planetary rollers 32. This configuration ensures that the planet washer 10 provides adequate piloting surface for the planetary rollers 32 while providing passages for the flow of lubricant.

The use of the arcuate slots 22 has several advantages over the use of scalloped portions 24 alone. The arcuate slot configuration allows more material along the piloting surface 28 of the central aperture 16 while maintaining more area for lubricant to pass through to lubricate the rollers 32. As a result, the piloting surface need not be drastically reduced to obtain more lubricant flow to the planetary rollers. The advantages of this configuration more than compensate for the somewhat more complicated punch and die tooling required.

Figure 4:
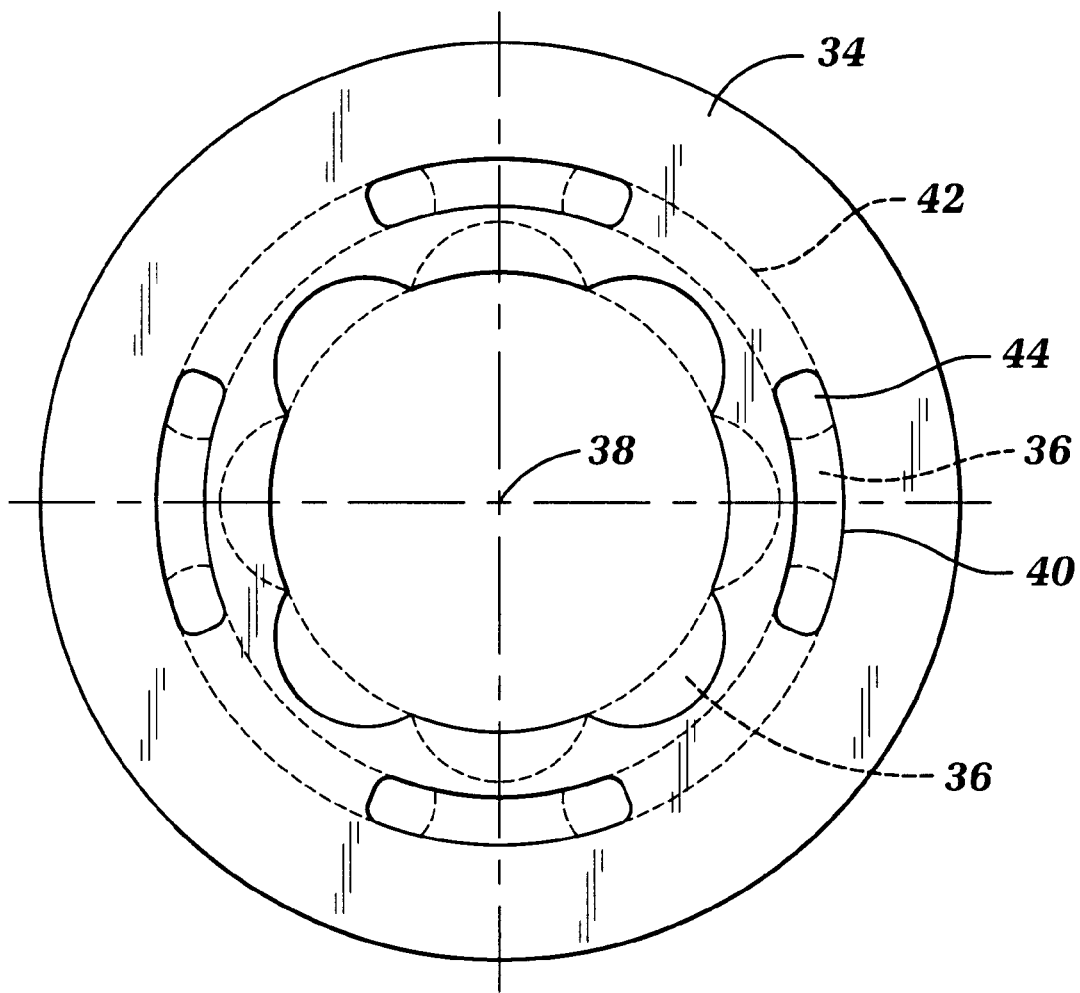
FIG. 4 is an end view of two planet washers, out of phase, illustrating the present invention.

FIG. 4 illustrates a first planet washer 34 and an identical second planet washer 36, shown in dotted lines, that are concentric about the same axis 38. The planet washers 34 and 36 have arcuate slots 40 and 42, respectively, with an angular length, corresponding to angle A of planet washer 10, that is somewhat greater than 45 degrees. As a result of this configuration, the arcuate slots 40 and 42 will always overlap at 44, even when the planet washers are out of phase from each other, as illustrated. This overlap ensures that lubricant will always be able to move from the carrier lube groove to the rollers.

The planet washer of the present invention provides enhanced lubricant flow through the carrier lubrication groove to the planetary rollers. The arcuate slots permit lubricant to reach the planetary rollers so that wear and failure of the planetary washer are reduced or avoided. Scalloped portions circumferentially located between the arcuate slots may be provided to further facilitate the flow of lubricant.

Having described the invention, what is claimed is:

1. A planet washer for use adjacent planetary rollers in a planetary gear set, the planet washer comprising:

a substantially flat steel ring having an axis, a round perimeter, a central aperture and two parallel end faces;

the flat steel ring providing at least two arcuate slots concentric with the round perimeter, the arcuate slots defined by arcs about the axis of the flat steel ring such that at least a portion of the arcuate slots is in axial alignment with planetary rollers when the planet washer is positioned in a planetary gear set.

2. The planet washer according to claim 1, wherein the arcuate slots are regularly spaced, circumferentially.

3. The planet washer according to claim 1, wherein the number of arcuate slots is four.

4. The planet washer according to claim 3, wherein the central aperture includes scalloped portions circumferentially spaced and located substantially between the arcuate slots.

5. The planet washer according to claim 1, wherein the arcuate slots are defined by arcs about the axis of the flat steel ring, the arcuate slots having radially inner and radially outer diameters.

6. The planet washer according to claim 5, wherein the radially inner diameter corresponds substantially with a pitch diameter of the planetary rollers.

7. The planet washer according to claim 5, wherein the radially outward diameter corresponds substantially with a radially outward surface of the planetary rollers.

8. The planet washer according to claim 5, wherein the number of arcuate slots is four and the arcuate slots have an angular length greater than 45 degrees.

* * * * *